(No Model.)
A. McMULLEN.
Oiler.
No. 239,525. Patented March 29, 1881.
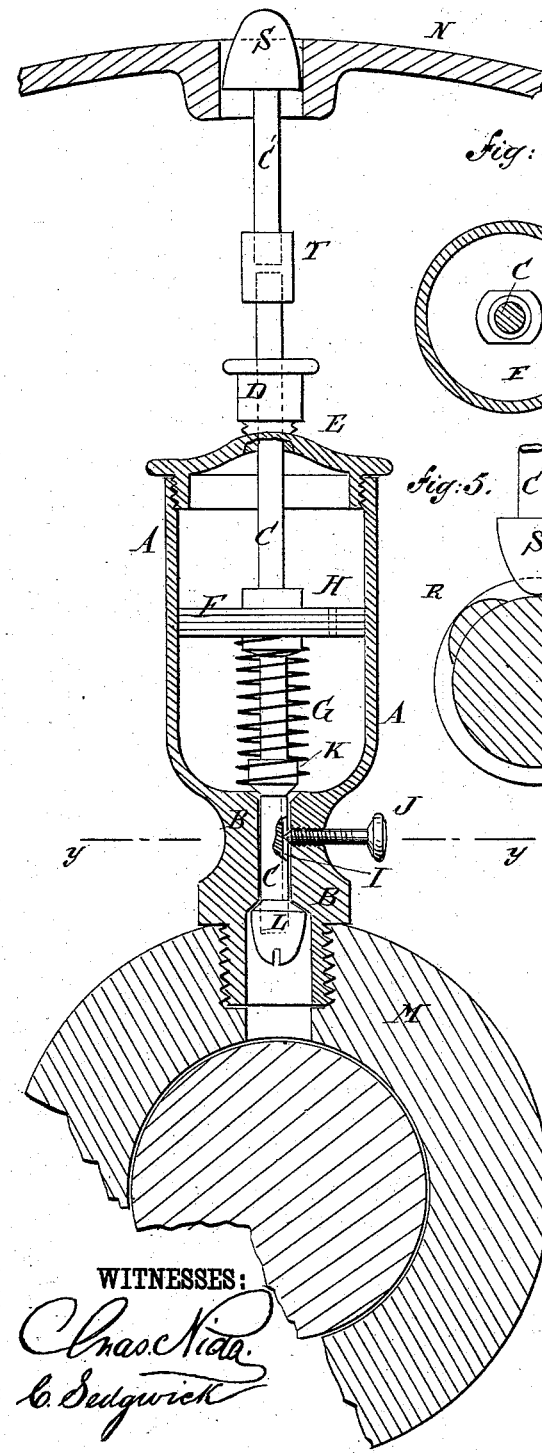
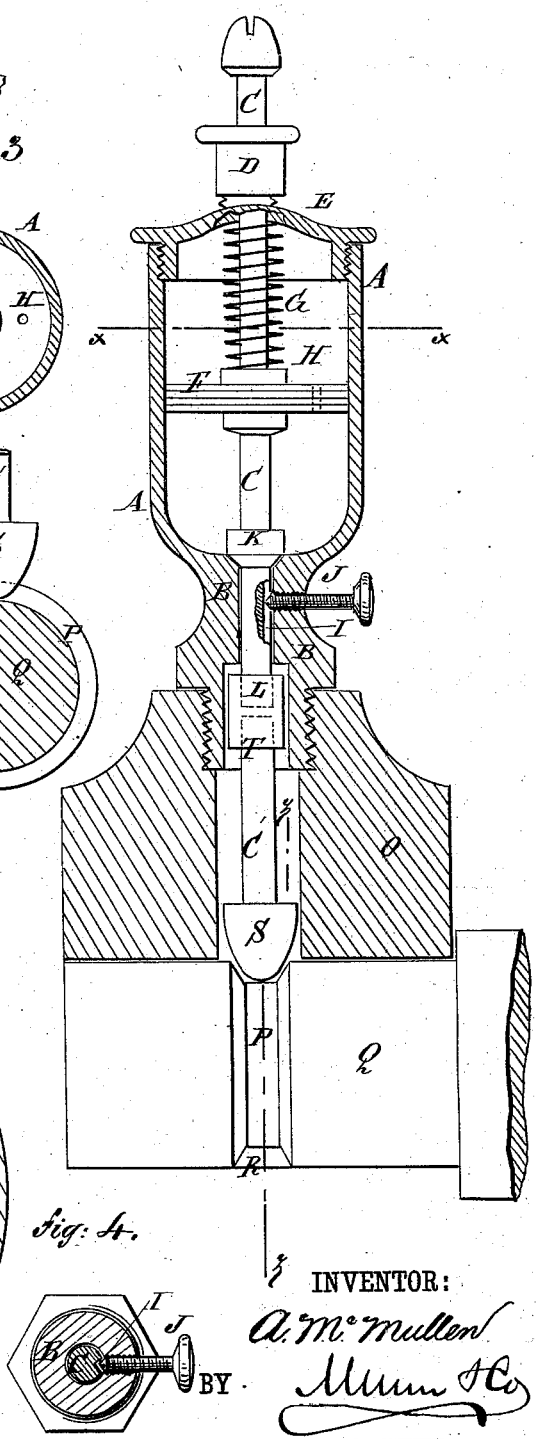
WITNESSES:
Chas. Nida
C. Sedgwick
INVENTOR:
A. McMullen
BY Munn & Co
ATTORNEYS.

UNITED STATES PATENT OFFICE.

ALEXANDER McMULLEN, OF OTTUMWA, IOWA.

OILER.

SPECIFICATION forming part of Letters Patent No. 239,525, dated March 29, 1881.

Application filed February 4, 1881. (No model.)

*To all whom it may concern:*

Be it known that I, ALEXANDER McMUL-LEN, of Ottumwa, in the county of Wapello and State of Iowa, have invented a new and useful Improvement in Oilers, of which the following is a specification.

Figure 1 is a sectional elevation of my improvement arranged as a loose-pulley oiler. Fig. 2 is a sectional elevation of the same arranged as a journal-oiler. Fig. 3 is a sectional plan view of the same, taken through the line *x x*, Fig. 2. Fig. 4 is a sectional plan view of the same, taken through the line *y y*, Fig. 1. Fig. 5 is a side elevation of the foot of the stem when arranged as a journal-oiler, the journal being shown in cross-section through the line *z z*, Fig. 2.

Similar letters of reference indicate corresponding parts.

The object of this invention is to facilitate the oiling of pulley-bearings, journal-bearings, and other wearing-surfaces, regulate the amount of oil applied, and prevent the escape of oil when not required.

The invention consists in constructing an oiler of an oil-chamber having a perforated neck, a stem passing through the oil-chamber, and perforated neck having an oil-passage in its side and carrying a piston to force out the oil, and two valves to control the egress of oil, and a spring to bring the stem, piston, and valves back to their proper positions after they have been forced forward to discharge oil, as will be hereinafter fully described.

A represents the oil chamber or reservoir, which is made cylindrical in form, and has a neck, B, upon its bottom provided with a screw-thread, so that it can be screwed into the hub of a loose pulley, or into the bearing of a journal or other bearing-surface. The neck B is perforated longitudinally to receive the lower part of the stem C, the upper part of which passes through a stuffing-box, D, in the cover E of the oil-chamber A.

To the stem C, within the oil-chamber A, is attached a piston, F, which has a hole, H, formed through it to allow oil to pass from one side of the said piston to the other.

Upon the stem C, at one side of the piston F, is placed a spiral spring, G, one end of which rests against the side of the said piston, and its other end rests against the end of the chamber A.

In the side of the part of the stem C that passes through the neck B is formed a longitudinal groove, I, to serve as an outlet-passage for the oil. The amount of oil passing out through the groove I is regulated by a screw, J, passing in through the side of the neck B in such a position that its forward end will enter the said groove, so that the size of the outlet-passage can be regulated by turning the said screw J in and out. Upon the stem C, just above bottom of the oil-chamber A, is placed a collar, K, which, when resting upon the bottom of the said oil-chamber A, serves as a valve to prevent any oil from entering the groove I. The lower part of the perforation of the neck B is enlarged or countersunk to receive a valve, L, to close the lower end of the groove I when the stem C is raised. The valve L may be a cap or button, as shown in Fig. 1, a coupling, as shown in Fig. 2, or a collar when the stem C is made in one piece, according as the particular use to which the oiler is to be applied may require. One or the other of the valves K L will always be closed, except while the stem C is in motion.

When the oiler is to be used for oiling a loose pulley the neck B is screwed into a hole in the hub M of the pulley, and the outer end of the stem C is extended to pass through a hole in the rim N of the said pulley, and project a quarter of an inch, more or less, beyond the outer surface of the said rim. In this case the spring G is placed upon the stem C below the piston F. As thus arranged, the driving-belt, at each revolution of the pulley, will come in contact with the end of the stem C and force it downward, causing the piston F to press the oil below it downward into the groove I until the valve K is closed. This downward movement of the stem C opens the lower valve, L, and the oil passes out to the surface to be oiled. As the end of the stem C passes out of contact with the belt the spring G forces the said stem C upward, closing the lower valve, L, to prevent any escape of oil, and opening the upper valve, K, to allow oil to again enter the groove I, ready to be forced out at the next downward movement of the stem C. With this arrangement no oil will escape while the pulley is stationary. When the oiler is to be used for oiling a journal the neck B is screwed into a hole in the journal-bearing, the spring G is placed above the piston E, the upper end of the stem C may be shortened, and the lower part of the said stem is extended, so that its lower end will pass through the journal-bearings O and enter a ring-groove, P, in the journal Q.

To the journal Q, within the ring-groove P, is attached, or upon it is formed, an inclined or rounded stop, R. With this arrangement, at each revolution of the journal Q the stop R comes in contact with the lower end of the stem C, and raises the said stem, opening the valve K to admit oil to the groove I, and closing the valve L to prevent the oil from escaping. As the end of the stem C passes off the stop R the spring G forces the stem C and piston F downward, opening the valve L, forcing oil out through the groove I, and then closing the valve K, until the stem C is again raised at the next revolution of the journal Q.

The working end of the stem C may be provided with a cap or button, S, as shown in Figs. 1, 2, and 5.

The stem C can be made with a detachable part, C', which can be attached to the upper end of the main part of the stem by a coupling, T, when the oiler is applied to a loose pulley, and attached to the lower end of the said stem when the oiler is to be applied to a journal. This construction allows the stem to be adjusted to the diameter of the pulley and the thickness of the bearings by using a longer or shorter extension-piece, C'.

Having thus fully described my invention, I claim as new and desire to secure by Letters Patent—

1. An oiler constructed substantially as herein shown and described, consisting of the oil-chamber A, having perforated neck B, the stem C, having groove I, the piston F, the two valves K L, and the spring G, as set forth.

2. In an oiler, the combination, with the perforated oil-chamber neck B and the stem C, having passage I, of the screw J, substantially as herein shown and described, whereby the amount of oil discharged is regulated, as set forth.

3. In an oiler, the combination, with the oil-chamber A, the stem C, and the valves K L, of the piston F, substantially as herein shown and described, whereby oil is forced out with a positive pressure, as set forth.

4. In an oiler, the combination, with the oil-chamber A, the stem C, piston F, and valves K L, of the spring G, substantially as herein shown and described, whereby the said stem, piston, and valves are returned to their places after each forward movement, as set forth.

5. In an oiler, the combination, with the perforated rim N of a pulley, of the piston-stem C of an oiler attached to the hub of the said pulley, substantially as herein shown and described, whereby the piston of the oiler will be operated at each revolution of the pulley by the pulley-belt to force out oil, as set forth.

ALEXANDER McMULLEN.

Witnesses:
CONRAD OSTERTAG,
JOHN C. F. NAYLOR.